(12) United States Patent
Jong et al.

(10) Patent No.: US 11,979,081 B2
(45) Date of Patent: May 7, 2024

(54) CURRENT SENSING TECHNIQUES FOR POWER CONVERTER CIRCUITS

(71) Applicant: Analog Devices, Inc., Wilmington, MA (US)

(72) Inventors: Owen Jong, San Jose, CA (US); Yingyi Yan, Fremont, CA (US); Ya Liu, Sunnyvale, CA (US); Jindong Zhang, Fremont, CA (US)

(73) Assignee: Analog Devices, Inc., Wilmington, MA (US)

( * ) Notice: Subject to any disclaimer, the term of this patent is extended or adjusted under 35 U.S.C. 154(b) by 118 days.

(21) Appl. No.: 17/714,937

(22) Filed: Apr. 6, 2022

(65) Prior Publication Data

US 2022/0376600 A1 Nov. 24, 2022

Related U.S. Application Data

(63) Continuation of application No. 17/711,680, filed on Apr. 1, 2022, and a continuation-in-part of
(Continued)

(51) Int. Cl.
*H02M 3/158* (2006.01)
*H02M 1/00* (2006.01)

(52) U.S. Cl.
CPC ....... *H02M 1/0009* (2021.05); *H02M 3/1582* (2013.01)

(58) Field of Classification Search
CPC ..... G05F 1/00; G05F 1/10; G05F 1/12; G05F 1/46; G05F 1/455; G05F 1/45;
(Continued)

(56) References Cited

U.S. PATENT DOCUMENTS 6,828,762 B2 12/2004 Brkovic
7,005,835 B2 2/2006 Brooks et al.
(Continued)

FOREIGN PATENT DOCUMENTS

CN 116896266 A 10/2023
DE 102023107696 A1 10/2023

OTHER PUBLICATIONS

"ISL6566: Three-Phase Buck PWM Controller with Integrated MOSFET Drivers for VRM9, VRM10, and AMD Hammer Applications", Intersil Data Sheet, (Mar. 9, 2006), 29 pgs.
(Continued)

*Primary Examiner* — Jeffrey A Gblende
(74) *Attorney, Agent, or Firm* — Schwegman Lundberg & Woessner, P.A.

(57) ABSTRACT

A current sensing technique for coupled inductors in switching regulator circuits, where the current sensing technique can provide the current information needed for a power converter design and can be implemented as a real-world solution. The current sensing techniques can provide complete information of the coupled inductor current, such as peak current, valley current, and intermediate ripples. The current sensing techniques can use a simple RC network, such as two resistors and two capacitors for 2-phase operation. The techniques, however, are not limited to two-phase operation. The current sensing techniques of this disclosure can be extended to power stage assembly implementations, e.g., DrMOS modules, with current output in order to increase signal-to-noise ratio, which is significant for reliable control. in addition, the current sensing techniques of this disclosure can be extended to multi-phase operation, such as three or more phases.

17 Claims, 11 Drawing Sheets

Related U.S. Application Data application No. 17/325,000, filed on May 19, 2021, now Pat. No. 11,652,415.

(58) Field of Classification Search
CPC ... G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/157; H02M 3/158; H02M 1/346; H02M 3/1588; H02M 2003/1566; H02M 3/1582; H02M 3/1584; H02M 2003/1557; H02M 1/0032; H02M 1/4225; H02M 7/217; H02M 1/0025; H02M 1/0045; H02M 1/0009; H05B 39/048; B23K 11/24; H04B 2215/069

See application file for complete search history.

(56) References Cited

U.S. PATENT DOCUMENTS

| | | | |
|---|---|---|---|
| 7,233,132 B1 | 6/2007 | Dong et al. | |
| 7,589,511 B2 | 9/2009 | Dong et al. | |
| 7,630,221 B2 | 12/2009 | Sui et al. | |
| 8,044,650 B2 | 10/2011 | Tang et al. | |
| 8,120,346 B2 | 2/2012 | Ostrom et al. | |
| 8,138,732 B2 | 3/2012 | Tseng et al. | |
| 8,502,515 B1* | 8/2013 | Wan | H02M 3/1584 323/272 |
| 8,823,352 B2 | 9/2014 | Zhang | |
| 9,037,884 B2* | 5/2015 | Rahardjo | G05F 1/66 323/212 |
| 9,520,788 B2 | 12/2016 | Kobayashi | |
| 9,525,351 B2 | 12/2016 | Li et al. | |
| 9,627,969 B2 | 4/2017 | Tschirhart et al. | |
| 9,748,843 B2 | 8/2017 | Zhang et al. | |
| 9,941,784 B1 | 4/2018 | Li et al. | |
| 10,483,847 B2 | 11/2019 | Tang et al. | |
| 10,483,860 B1 | 11/2019 | Xiao et al. | |
| 11,652,415 B2* | 5/2023 | Jong | H02M 3/158 323/282 |
| 2011/0194317 A1 | 8/2011 | Truettner et al. | |
| 2014/0002038 A1* | 1/2014 | Hsu | H02M 3/1584 323/271 |
| 2016/0012965 A1 | 1/2016 | Jiang et al. | |
| 2016/0187386 A1 | 6/2016 | El-damak et al. | |
| 2020/0088769 A1 | 3/2020 | Jin et al. | |
| 2022/0109368 A1* | 4/2022 | Zhou | H02M 1/32 |
| 2022/0376620 A1 | 11/2022 | Jong et al. | |
| 2023/0318430 A1 | 10/2023 | Chen et al. | |

OTHER PUBLICATIONS

"LTC3774: Dual, Multiphase Current Mode Synchronous Controller for Sub-Milliohm DCR Sensing", Linear Technology Data Sheet, (2013), 38 pgs.

"LTC3853: Triple Output, Multiphase Synchronous Step-Down Controller", Linear Technology Data Sheet, (2008), 36 pgs.

"LTC3882: Dual Output PolyPhase Step-Down DC/DC Voltage Mode Controller with Digital Power System Management", Linear Technology Data Sheet, (2014), 107 pgs.

"Multiphase Buck Voltage Mode DC/DC Controllers", Analog Devices Inc., [Online] Retrieved from the Internet: <URL: https://www.mouser.com/new/analog-devices/adi-multiphase-dc-dc-controllers/>, (Sep. 2, 2020), 3 pgs.

"VRD11/VRD10, K8 Rev F 2/3/4-Phase PWM Controllers with Integrated Dual MOSFET Drivers", Maxim Integrated Products, Inc., (2006), 50 pgs.

"ZL8801: Dual Phase PMBus ChargeMode Control DC/DC Digital Controller", Renesas Data Sheet, (Mar. 27, 2015), 87 pgs.

Dong, Yan, et al., "DCR Current Sensing Method for Achieving Adaptive Voltage Positioning (AVP) in Voltage Regulators with Coupled Inductors", 37th IEEE Power Electronics Specialists Conference, (2006), 5 pgs.

Hegarty, Timothy, "3D-Integrated MOSFETs With Ultra-Low DQR Inductor Provides High-Efficiency DC/DC Regulator", Power Electronics, [Online] Retrieved from the Internet: <URL: https://www.powerelectronics.com/technologies/discrete-power-semis/article/21861337/3dintegrated-mosfets-with-ultralow-dcr-inductor-provides-highefficiency-dcdc-regulator>, (Nov. 13, 2013), 22 pgs.

Hegde, Krishnamurthy, "TPS65311-Q1 BUCK1 Controller DCR Current Sensing", Texas Instruments Application Report SLVA791, (Sep. 2016), 9 pgs.

Oraw, Bradley, et al., "Lossless DCR Current Sensing for Multi-Winding Coupled Inductors", IEEE 30th International Telecommunications Energy Conference (INTELEC), (2008), 6 pgs.

Xu, Ming, et al., "Novel Coupled-Inductor Multi-phase VRs", 22nd Annual IEEE Applied Power Electronics Conference and Exposition (APEC), (2007), 113-119.

Zhang, Henry, et al., "Switch Mode Power Supply Current Sensing—Part 3: Current Sensing Methods", Analog Devices Technical Article, (2018), 4 pgs.

Zhu, Guangyong, et al., "Modeling and Design Considerations of Coupled Inductor Converters", 25h Annual IEEE Applied Power Electronics Conference and Exposition (APEC), (2010), 7 pgs.

"U.S. Appl. No. 17/325,000, Non Final Office Action mailed Aug. 25, 2022", 6 pgs.

"U.S. Appl. No. 17/325,000, Response filed Nov. 15, 2022 to Non Final Office Action mailed Aug. 25, 2022", 9 pgs.

"U.S. Appl. No. 17/325,000, Notice of Allowance mailed Jan. 5, 2023", 8 pgs.

"U.S. Appl. No. 17/325,000, Corrected Notice of Allowability mailed Apr. 12, 2023", 2 pgs.

"Chinese Application Serial No. 202310344016.3, Office Action mailed May 8, 2023", w/o English translation, 1 pg.

"Chinese Application Serial No. 202310344016.3, Voluntary Amendment Filed Oct. 30, 2023", w/o English claims, 11 pgs.

U.S. Appl. No. 17/325,000, filed May 19, 2021, Current Sensing Techniques for Power Converter Circuits.

U.S. Appl. No. 17/711,680, filed Apr. 1, 2022, Trans-Inductor Voltage Regulator Current Sensing Techniques.

\* cited by examiner

CURRENT SENSING TECHNIQUES FOR POWER CONVERTER CIRCUITS

CLAIM OF PRIORITY

This application is continuation-in-part of U.S. patent application Ser. No. 17/325,000, titled "CURRENT SENSING-TECHNIQUES FOR POWER. CONVERTER CIRCUITS" to Owen Jong et al., filed on May 19, 2021, and claims the benefit of priority of U.S. patent application Ser. No. 17/711,680, titled "TRANS-INDUCTOR VOLTAGE REGULATOR CURRENT SENSING METHODS" to Xuebing Chen et al., filed on Apr. 1, 2022, the entire contents of each being incorporated herein by reference.

FIELD OF IHE DISCLOSURE

This document pertains generally, but not by way of limitation, to power converter circuits.

BACKGROUND

One of the most common challenges in designing portable electronic devices is the generation and maintenance of a regulated voltage from an unregulated voltage source, such as a battery. Typically, a voltage regulator is used for this purpose. A voltage regulator may be designed as a linear regulator or a switching regulator.

A linear regulator provides closed loop control to regulate the voltage at the load. This type of regulator may be used to provide a constant output voltage that has a lower magnitude than the unregulated voltage source.

In contrast, a switching regulator uses an energy-storage element, such as an inductor, to transfer energy from the unregulated power source to the load in discrete bursts. Feedback circuitry may be used to regulate the energy transfer to maintain a constant voltage at the load. Because the switching regulator operates to transfer energy in discrete bursts, it can he configured to step-up or step-down the voltage of the unregulated voltage source. Moreover, switching regulators are generally more efficient than linear regulators.

Various types of switching regulators are commonly used today in portable electronic devices. A buck converter is an inductor-based regulator used to step-down or buck the unregulated voltage source. A boost converter is an inductor-based regulator used to step-up or boost the unregulated voltage source. In some applications, a buck-boost converter may be used to provide a regulated output that is higher, lower or the same as the unregulated voltage source.

Current-mode control can be used for switching regulators due to its high reliability, simple loop compensation design, and simple and reliable load sharing capability. The current sense signal can be an important part of a current-mode switch mode power supply design; it is used to regulate the output and also provides overcurrent protection.

SUMMARY OF THE DISCLOSURE

This disclosure describes a current sensing technique for coupled inductors in switching regulator circuits, where the current sensing technique can provide the current information needed for a power converter design and can be implemented as a real-world solution. The current sensing techniques of this disclosure can provide complete information of the coupled inductor current, such as peak current, valley current, and intermediate ripples, which is needed for power converter design, both in control and protection. The current sensing techniques of this disclosure use a simple RC network, such as two resistors and two capacitors for 2-phase operation. The techniques, however, are not limited to two-phase operation. The current sensing techniques of this disclosure can be extended to power stage assembly implementations, e.g., DrMOS modules, with current output in order to increase signal-to-noise ratio, which is significant for reliable control. In addition, the current sensing techniques of this disclosure can be extended to multi-phase operation, such as three or more phases.

In some aspects, this disclosure is directed to a circuit comprising: a first coupled inductor including a first winding and a second winding; a first sensing network coupled with the first coupled inductor, the first sensing network including: a first resistor coupled to receive a signal representing voltage information at an input of the first winding; a second resistor coupled to receive a signal representing voltage information at an input of the second winding; a first capacitor coupled between the first resistor and a first sensing node; and a second capacitor coupled between the second resistor and a second sensing node, and a control circuit coupled with the first sensing node and the second sensing node, the control circuit to: receive a first voltage across at least the first capacitor, wherein the first voltage represents a current through the first winding of the first coupled inductor.

In some aspects, this disclosure is directed to a method of sensing inductor winding current in a coupled inductor including a first winding and a second winding, the method including: coupling a first resistor to receive a signal representing voltage information at an input of the first winding; coupling a second resistor to receive a signal representing voltage information at an input of the second winding; coupling a first capacitor between the first resistor and a first sensing node; coupling a second capacitor between the second resistor and a second sensing node, wherein a sensing network includes the first resistor, the second resistor, the first capacitor, and the second capacitor; and receiving a first voltage across the first capacitor, wherein the first voltage represents a current through the first winding of the coupled inductor.

In some aspects, this disclosure is directed to a circuit comprising: a first coupled inductor including a first winding and a second winding; a first sensing network coupled with the first coupled inductor, the first sensing network including: a first resistor coupled with an input of the first winding; a second resistor coupled with an input of the second winding; a first capacitor coupled between the first resistor and a first sensing node; and a second capacitor coupled between the second resistor and a second sensing node, and a control circuit coupled with the first sensing node and the second sensing node, the control circuit to: receive a first voltage across the first capacitor, wherein the first voltage represents a current through the first winding of the first coupled inductor.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Current-mode control can be used for switching regulators due to its high reliability, simple loop compensation design, and simple and reliable load sharing capability. A current sense signal can be an important part of a current-mode switch mode power supply design because it is used to regulate the output and can also provide overcurrent protection. Current information that can be sensed include the peak inductor current, the valley inductor current (the minimum value of the inductor current when in continuous conduction mode) and the average output current.

In some switching regulator circuits, it can be desirable to utilize coupled inductors, rather than individual inductors, as energy-storage elements to transfer energy from the unregulated power source to the load in discrete bursts. Coupled inductors can provide higher efficiency and better transient response while reducing the size of solution.

Some approaches to current sensing for coupled inductors in switching regulator circuits provide only some of the current information needed for a power converter design. In other approaches, such as theoretical approaches, to current sensing for coupled inductors in switching regulator circuits, all of the current information needed can be acquired, but the current sensing design is overly complicated and not implementable as a real-world solution.

The present inventors have recognized a need for a current sensing technique for coupled inductors in switching regulator circuits, where the current sensing technique can provide the current information needed for a power converter design and can be implemented as a real-world solution. The current sensing techniques of this disclosure can provide complete information of the coupled inductor current, such as peak current, valley current, and intermediate ripples, which is needed for power converter design, both in control and protection. The current sensing techniques of this disclosure use a simple RC network, such as two resistors and two capacitors for 2-phase operation. The techniques, however, are not limited to two-phase operation. The current sensing techniques of this disclosure can be extended to power stage assembly implementations, e.g., DrMOS modules, with current output in order to increase signal-to-noise ratio, which is significant for reliable control. In addition, the current sensing techniques of this disclosure can be extended to multi-phase operation, such as three or more phases.

Figure 1:
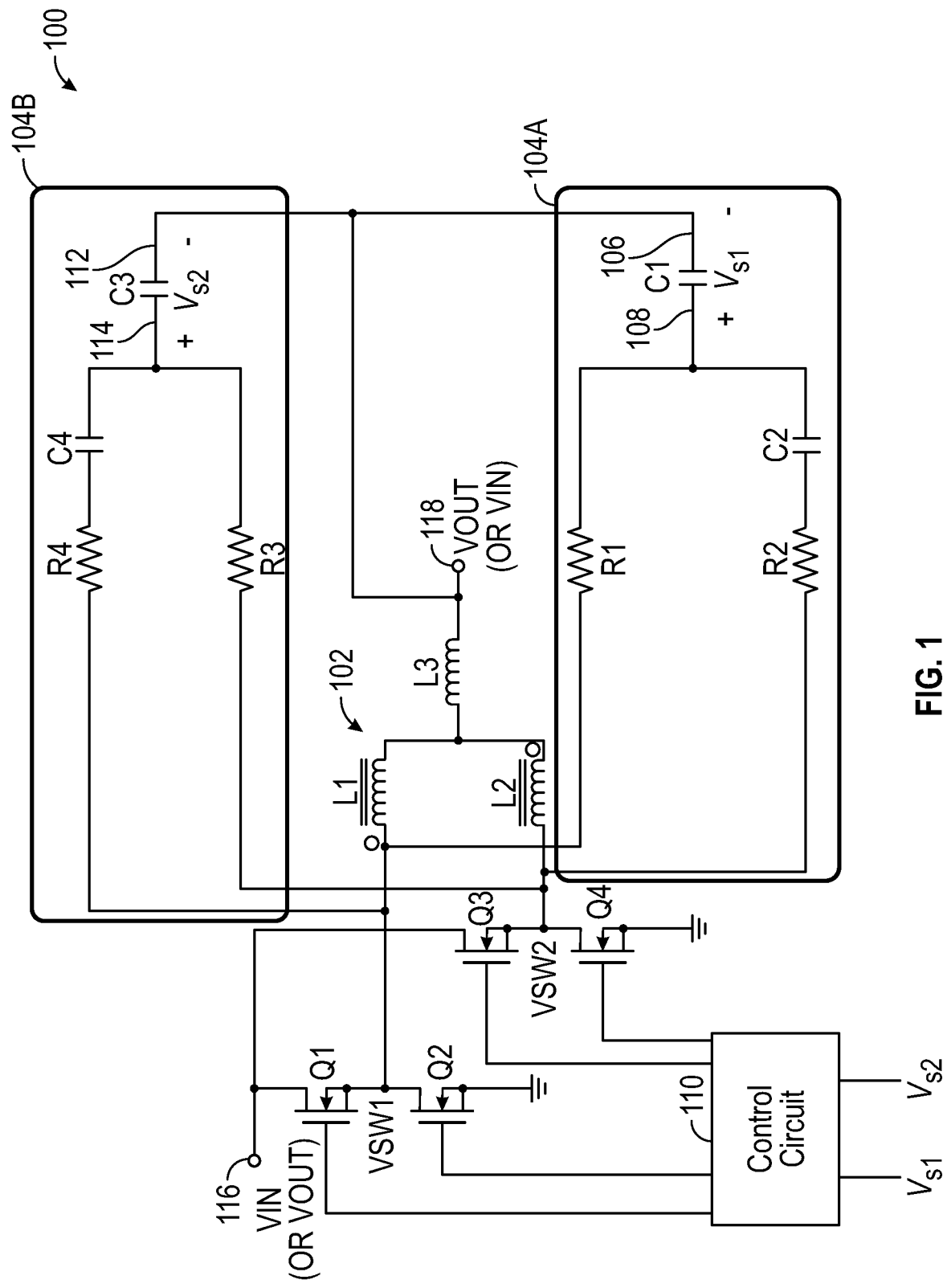
FIG. 1 is an example of a current sensing circuit for use with a coupled inductor that can implement various techniques of this disclosure.

FIG. 1 is an example of a current sensing circuit for use with a coupled inductor that can implement various techniques of this disclosure. The current sensing circuit 100 can include a first coupled inductor 102 including a first winding L1 and a second winding L2 and a first sensing network 104A coupled with the first coupled inductor 102.

The first sensing network 104A can include a first resistor R1 coupled to receive a signal representing voltage information at an input of the first winding L1, a second resistor R2 coupled to receive a signal representing voltage information at an input of the second winding L2, a first capacitor C1 coupled between the first resistor R1 and a first sensing node 106, and a second capacitor C2 coupled between the second resistor R2 and a second sensing node 108. In the example shown in FIG. 1, the first resistor R1 is coupled with an input of the first winding L1, and the second resistor R2 is coupled with an input of the second winding L2.

Current sensing information about the inductor current through the first winding L1 can be obtained by sensing a voltage $Vs_1$ across the second capacitor C2, where the voltage $Vs_1$ represents a current through the first winding L1 of the first coupled inductor 102. As shown in FIG. 1, a control circuit 110, e.g., a multi-phase controller, can receive the first voltage $Vs_1$ across the first capacitor C1 and can determine information about the coupled inductor current, such as peak current, valley current, and intermediate ripples.

In some non-limiting implementations, the current sensing techniques of this disclosure can be used to sense current information in switching regulators. In the example shown in FIG. 1, the circuit 100 can include a first switching circuit including a first switching element Q1 and a second switching element Q2 and a second switching circuit including a third switching element Q3 and a fourth switching element Q4. In some examples, the switching elements Q1-Q4 can be transistors, such as field-effect transistors (FET).

As seen in FIG. 1, the first winding L1 of the coupled inductor 102 can be coupled to a first switching node VSW1 between the first switching element Q1 and the second switching element Q2. Similarly, the second winding L2 of the coupled inductor 102 can be coupled to a second switching node VSW2 between the third switching element Q3 and the fourth switching element Q4.

The control circuit 110 can be coupled with the first switching circuit and the second switching circuit. The control circuit 110 can control the operation of the switching elements Q1-Q4 using a timing phase, e.g., pulse-width modulated (PWM) signal, such as by applying control signals to their corresponding control terminals, e.g., gate terminal of a FET.

In some examples, the first switching circuit and the second switching circuit can be arranged in a buck configuration. For example, a buck configuration can be implemented by applying an input voltage VIN at node 116 with an output voltage VOUT generated at node 118.

In other examples, the first switching circuit and the second switching circuit can be arranged in a boost configuration. For example, a boost configuration can be implemented by applying an input voltage VIN at node 118 with an output voltage VOUT generated at node 116.

In some examples, the circuit 100 can include a second sensing network 104B for sensing inductor current through the second winding L2 of the coupled inductor 102. The second sensing network 104B can be similar to the first sensing network 104A and can include a third resistor R3 coupled to receive a signal representing voltage information at an input of the second winding L2, a fourth resistor R4 coupled to receive a signal representing voltage information at an input of the first winding L1, a third capacitor C3 coupled between the third resistor R3 and a third sensing node 112, and a fourth capacitor C4 coupled between the fourth resistor R4 and a fourth sensing node 114. In the example shown in FIG. 1, the third resistor R3 is coupled with an input of the second winding L2, and the fourth resistor R4 is coupled with an input of the first winding L1.

Current sensing information about the inductor current through the second winding L2 can be obtained by sensing a voltage $Vs_2$ across the second capacitor C2, where the voltage $Vs_1$ represents a current through the first winding L1 of the first coupled inductor 102. As shown in FIG. 1, a control circuit 110 can receive the first voltage $Vs_1$ across the third capacitor C3 and can determine information about the coupled inductor current, such as peak current, valley current, and intermediate ripples.

Figure 2:
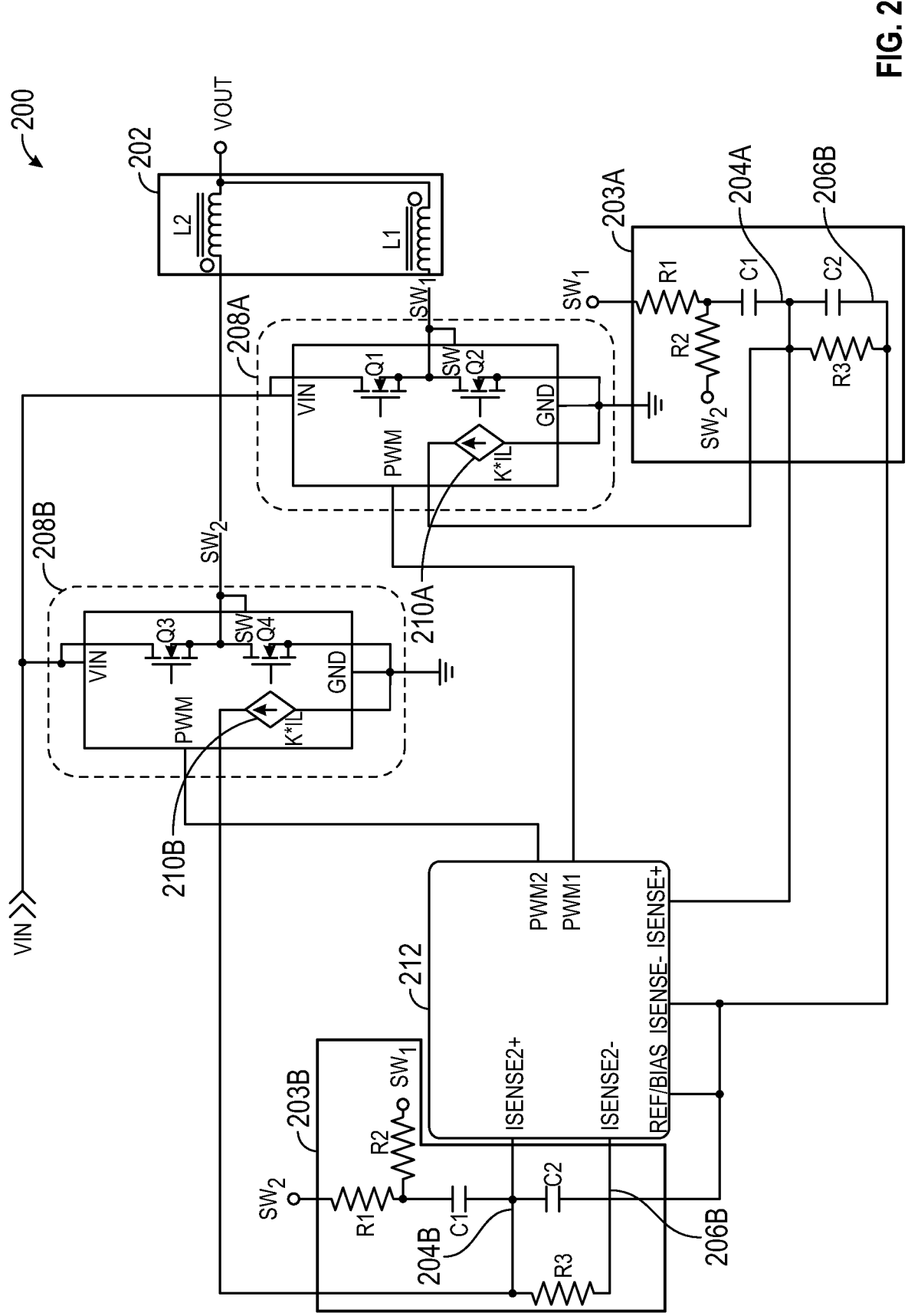
FIG. 2 is another example of a current sensing circuit for use with a coupled inductor that can implement various techniques of this disclosure.

FIG. 2 is another example of a current sensing circuit for use with a coupled inductor that can implement various techniques of this disclosure. As mentioned above, the current sensing techniques can be extended to power stage assembly implementations, e.g., DrMOS modules, with current output in order to increase signal-to-noise ratio, which is significant for reliable control. The current sensing circuit 200 of FIG. 2 can be used along with a power stage assembly, such as a driver FET (DrMOS) module. The current sensing circuit 200 can include a first coupled inductor 202 including a first winding L1 and a second winding L2 and a first sensing network 203A coupled with the first coupled inductor 202.

The first sensing network 203A can include a first resistor R1 coupled to receive a signal representing voltage information at an input of the first winding L1, a second resistor R2 coupled to receive a signal representing voltage information at an input of the second winding L2, a first capacitor C1 coupled between the first resistor R1 and a first sensing node 204A, and a second capacitor C2 coupled between the second resistor R2 and a second sensing node 206A. In the example shown in FIG. 2, the first resistor R1 is coupled with an input of the first winding L1, and the second resistor R2 is coupled with an input of the second winding L2.

In the example shown in FIG. 2, the first resistor R1 and the second resistor R2 share the first capacitor C1. In some examples, rather than sharing the first capacitor C1, a third capacitor can be coupled between the second resistor R2 and the second sensing node 206A and the connection between the second resistor R2 and the first capacitor C1 can be removed.

The circuit 200 can include a first power stage assembly 208A, such as a DrMOS module. The first power stage assembly 208A can include a first switching circuit including a first switching element Q1 and a second switching element Q2. The first winding L1 of the coupled inductor 202 can be coupled to a first switching node SW1 between the first switching element Q1 and the second switching element Q2, like in FIG. 1.

The first power stage assembly 208A can also include a first signal source 210A. The first signal source 210A can output a first representation of a current through the first winding L1 of the first coupled inductor 202, where the representation includes a DC component of the current through the first winding of the first coupled inductor. For example, the first signal source 210A can output a first representation of the current through the first winding where the first representation is a scaling factor K multiplied by the inductor current $i_L$ through the first winding L1 ($K \times i_L$). The DC component of the current is achieved by $(K \times i_L) \times R3$, with the second capacitor C2 acts as a filter for $(K \times i_L) \times R3$. A control circuit 212, e.g., a multi-phase controller, can receive the first representation of the current.

The AC component of the inductor current $i_L$ through the first winding L1 can be determined using the R1, C1 path. As seen in FIG. 2, a control circuit 212 can receive the current sensing information about the inductor current through the first winding L1, which can be obtained by sensing a voltage across the second capacitor C2, where the voltage across the second capacitor C2 represents a current through the first winding L1 of the first coupled inductor 202. The control circuit 212 can receive the voltage across the second capacitor C2 and can determine information about the coupled inductor current, such as peak current, valley current, and intermediate ripples.

The circuit 200 can include a second power stage assembly 208B, such as a DrMOS module. The second power stage assembly 208B can include a second switching circuit including a third switching element Q1 and a fourth switching element Q2. The second winding L2 of the coupled inductor 202 can be coupled to a second switching node SW2 between the third switching element Q1 and the fourth switching element Q2, like in FIG. 1.

The second power stage assembly 204A can also include a second signal source 210B that can output a second representation of a current through the second winding L2 ($K \times i_L$) of the first coupled inductor 202, where the representation includes a DC component of the current through the second winding of the first coupled inductor. The control circuit 212 can receive the second representation of the current. The AC component of the inductor current $i_L$ through the second winding L2 can be determined using the R2, C1 path. In a buck configuration, an output voltage can be generated at node Vo in FIG. 2.

The current sensing circuit 200 can include a second sensing network coupled 203B with the first coupled inductor 202. Like the first sensing network 203A, the second sensing network 203B can include a first resistor R1 coupled to receive a signal representing voltage information at an input of the first winding L1, a second resistor R2 coupled to receive a signal representing voltage information at an input of the second winding L2, a first capacitor C1 coupled between the first resistor R1 and a first sensing node 204B, and a second capacitor C2 coupled between the second resistor R2 and a second sensing node 206B. In the example shown in FIG. 2, the first resistor R1 is coupled with an input of the second winding L2, and the second resistor R2 is coupled with an input of the first winding L1.

Current sensing information about the inductor current through the first winding L1 can be obtained by sensing a voltage across the capacitor C2 of the first sensing network 203A. Current sensing information about the inductor current through the second winding L2 can be obtained by sensing a voltage across the capacitor C2 of the second sensing network 203B. As shown in FIG. 2, a control circuit 212 can receive the voltage across these capacitors and can determine information about the coupled inductor current, such as peak current, valley current, and intermediate ripples.

Figure 3:
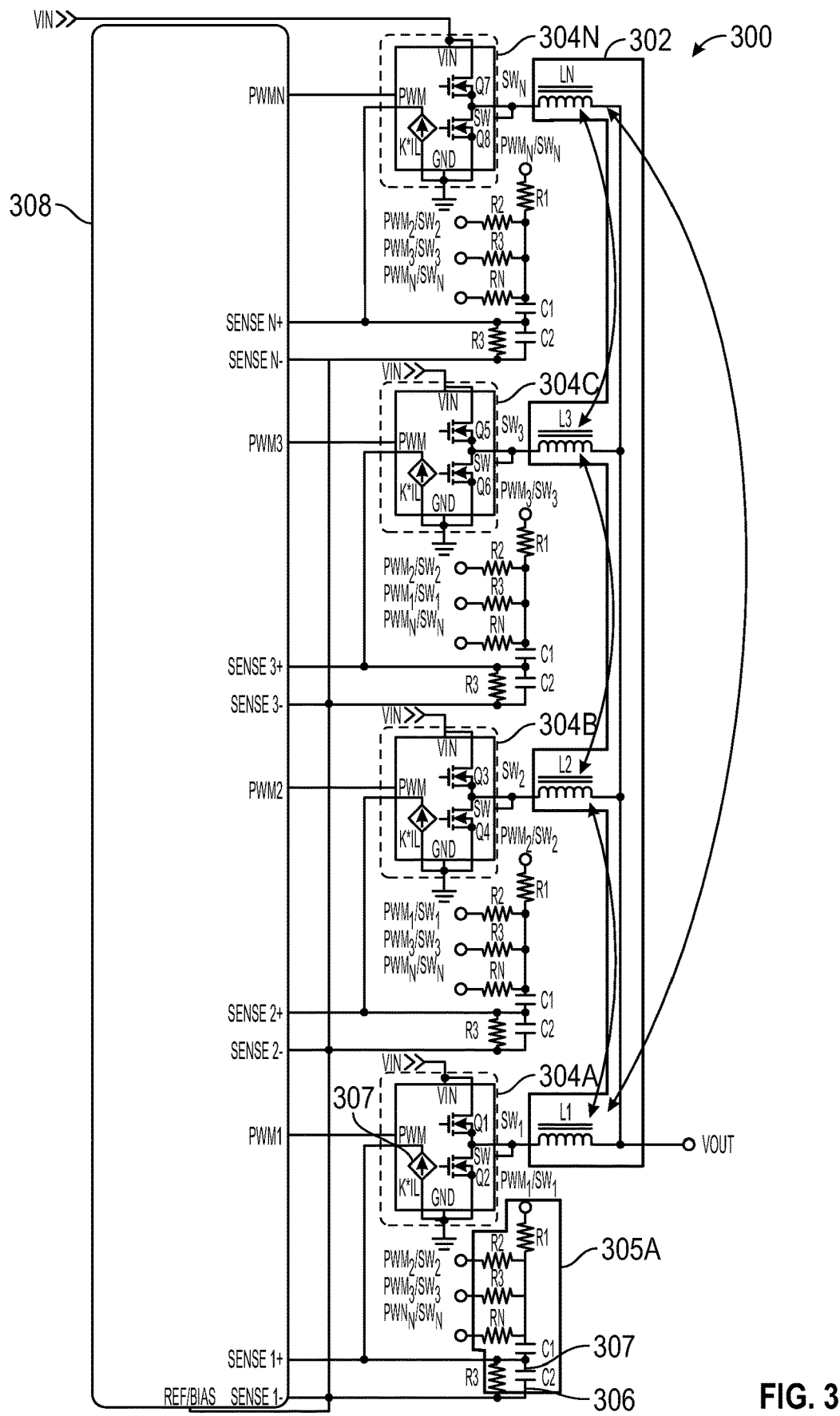
FIG. 3 is another example of a current sensing circuit for use with a coupled inductor that can implement various techniques of this disclosure.

FIG. 3 is another example of a current sensing circuit for use with a coupled inductor that can implement various techniques of this disclosure. The current sensing circuit 300 of FIG. 3 can be used along with a power stage assembly, such as a driver FET (DrMOS) module. The current sensing circuit 300 of FIG. 3 is similar to the circuit 200 of FIG. 2, but shows N phases. Using the current sensing technique of FIG. 3, the current sensing circuit can use each PWMN or switch node signal (SWN) to determine the current through each winding of a coupled inductor. The example of a current sensing circuit 300 can include a first coupled inductor 302 including a first winding L1 and a first sensing network coupled with the first coupled inductor 302.

The circuit 300 can include a first power stage assembly 304A, such as a DrMOS module. The first power stage assembly 304A can include a first switching circuit including a first switching element Q1 and a second switching element Q2. The first winding L1 of the coupled inductor 302 can be coupled to a first switching node SW1 between the first switching element Q1 and the second switching element Q2.

The first sensing network 305A can include a first resistor R1 coupled to receive a signal representing voltage information at an input of the first winding L1, a second resistor R2 coupled to receive a signal representing voltage information at an input of a second winding L2 of the first coupled inductor 302, a first capacitor C1 coupled between the first resistor R1 and a first sensing node 306, and a second capacitor C2 coupled between the second resistor R2 and a second sensing node 307.

In contrast to FIG. 2 in which the first resistor R1 is coupled with an input of the first winding L1, the first resistor R1 in the example shown in FIG. 3 is coupled to receive an output of the control circuit 308, e.g., a multi-phase controller. The control circuit 308 can reproduce the switch node voltage SW1 by multiplying the input voltage and the PWM signal (PWM1) that the control circuit 308 generates to control the switching elements Q1 and Q2 of the first power stage assembly 304A. The first resistor R1 can be connected to receive the reproduced switch node voltage SW1.

For each additional phase of a multi-phase buck or boost converter, a corresponding additional power stage assembly is needed, shown as 304B-304N, coupled to the control circuit 308. The control circuit 308 can send a PWM signal that corresponds to each power stage assembly. Like with the first resistor R1, the second resistor R2 can be coupled with a second output of the control circuit 308. For example, a second power stage assembly 304B like the first power stage assembly 304A can be included. The second power stage assembly 304B can include two switching elements with a second switch node voltage SW2 therebetween. The control circuit 308 can reproduce the second switch node voltage SW2 by multiplying the input voltage and a second PWM signal (PWM2) that the control circuit 308 generates to control the switching elements of the second power stage assembly. The second resistor R2 can be connected to receive the reproduced switch node voltage SW2. The control circuit 308 can receive the current information through each corresponding additional winding, such as windings L2 and L3, of the coupled inductor 302. The techniques of FIG. 3 are not limited to coupled inductors with one, two, or three windings. Rather, the techniques can be extended to N windings.

For each additional phase of a multi-phase buck or boost converter, corresponding additional second resistors R2A-R2N can be included and connected to receive a reproduced switch node voltage corresponding to the phase. For example, the coupled inductor 302 can include a third winding L3, and the first sensing network 305A can include resistor R2A coupled in parallel with the second resistor R2, where the resistor R2A is coupled to a third output of the control circuit and coupled to receive a signal representing voltage information at an input of the third winding L3. That is, the control circuit 308 can reproduce a third switch node voltage SW3 of a third power stage assembly 304C by multiplying the input voltage and a third PWM signal (PWM3) that the control circuit 308 generates to control the switching elements of the third power stage assembly 304C. The resistor R2A can be connected to receive the reproduced switch node voltage SW3.

The first power stage assembly 304A can also include a first signal source 307. The first signal source 307 can output a first representation of a current through the first winding L1 of the first coupled inductor 302, where the representation includes a DC component of the current through the first winding of the first coupled inductor. For example, the first signal source 307 can output a first representation of the current through the first winding L1, where the first representation is a scaling factor K multiplied by the inductor current it, through the first winding L1 ($K \times i_L$). The DC component of the current is achieved by $(K \times i_L) \times R3$, with the second capacitor C2 acts as a filter for $(K \times i_L) \times R3$. The control circuit 308, e.g., a multi-phase controller, can receive the first representation of the current.

The AC component of the inductor current $i_L$ through the first winding L1 can be determined using the R1, C1 path. As seen in FIG. 3, the control circuit 308 can receive the current sensing information about the inductor current through the first winding L1, which can be obtained by sensing a voltage across the second capacitor C2, where the voltage across the second capacitor C2 represents a current through the first winding L1 of the first coupled inductor 302. The control circuit 308 can receive the voltage across the second capacitor C2 and can determine information about the coupled inductor current, such as peak current, valley current, and intermediate ripples.

As seen in FIG. 3, additional sensing networks, similar to the first sensing network 305A, can be included for each of the N phases.

Figure 4:
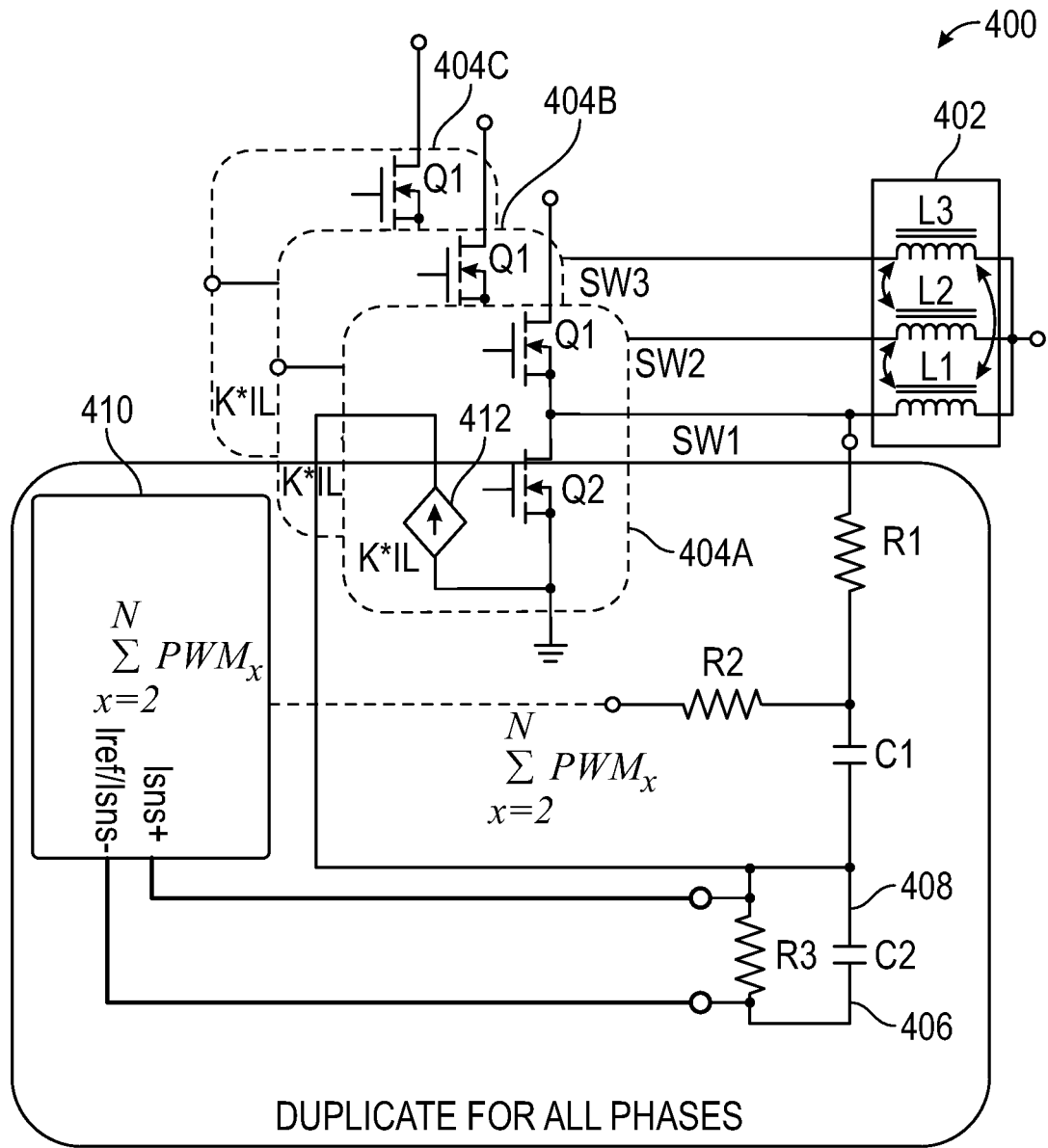
FIG. 4 is another example of a current sensing circuit for use with a coupled inductor that can implement various techniques of this disclosure.

FIG. 4 is another example of a current sensing circuit for use with a coupled inductor that can implement various techniques of this disclosure. The current sensing circuit 400 of FIG. 4 can be used along with a power stage assembly, such as a driver FET (DrMOS) module. Using the current sensing technique of FIG. 4, the current sensing circuit can sum the PWM or switch node signals (VSW) to determine the current through each winding of a coupled inductor. The example of a current sensing circuit 400 can include a first coupled inductor 402 including a first winding L1, a second winding L2, and a third winding L3 and a first sensing network coupled with the first coupled inductor 302. The techniques of FIG. 3 are not limited to coupled inductors with one, two, or three windings. Rather, the techniques can be extended to N windings.

For a 3-phase implementation, the circuit 400 can include power stage assemblies 404A-404C, such as DrMOS modules. Each power stage assembly can include a first switching circuit including a first switching element Q1 and a second switching element Q2. Referring to the first power stage assembly 404A, the first winding L1 of the coupled inductor 402 can be coupled to a first switching node SW1 between the first switching element Q1 and the second switching element Q2. The windings L2, L3 of the coupled inductor 402 can be similarly coupled with power stage assemblies 404B, 404C, respectively.

The circuit 400 can include sensing networks similar to those described above. For example, a first sensing network can include a first resistor R1 coupled to receive a signal representing voltage information at an input of the first winding L1, a second resistor R2 coupled to receive a signal representing voltage information at an input of a second winding L2 of the first coupled inductor 302, a first capacitor C1 coupled between the first resistor R1 and a first sensing node 406, and a second capacitor C2 coupled between the second resistor R2 and a second sensing node 408. In the example shown in FIG. 4, the first resistor R1 is coupled with an input of the first winding L1, unlike in FIG. 3. The sensing network shown can be duplicated for each of the phases.

The first power stage assembly 404A, such as a DrMOS module, can include a first switching circuit including a first switching element Q1 and a second switching element Q2. The first winding L1 of the coupled inductor 202 can be coupled to a first switching node SW1 between the first switching element Q1 and the second switching element Q2. The power stage assemblies 404B, 404C can be similarly configured. In contrast to FIG. 2 in which the resistors R2 and R2A-R2N were each connected to a corresponding output of the control circuit, in FIG. 4, the resistor R2 of a sensing network receives the sum of the reproduced switch node voltages of the other phases (phases 2 and 3). For example, the control circuit 410 can reproduce the switch node voltage SW2 at an input of the second winding L2 by multiplying the input voltage and the PWM signal (PWM2) that the control circuit 410 generates to control the switching elements Q1, Q2 of the second power stage assembly 404B. Similarly, the control circuit 410 can reproduce the switch node voltage SW3 at an input of the third winding L3 by multiplying the input voltage and the PWM signal (PWM3) that the control circuit 410 generates to control the switching elements Q1, Q2 of the third power stage assembly 404C. The control circuit 410 can combine that information digitally and output a current representing that combined information to the resistor R2. In this manner, the control circuit is configured to generate a signal representing a combination of information about the second winding L2 and the third winding L3.

The first power stage assembly 404A can also include a first signal source 412. The first signal source 412 can output a first representation of a current through the first winding L1 of the first coupled inductor 402, where the representation includes a DC component of the current through the first winding L1 of the first coupled inductor. For example, the first signal source 412 can output a first representation of the current through the first winding L1, where the first representation is a scaling factor K multiplied by the inductor current $i_L$ through the first winding L1 ($K \times i_L$). The DC component of the current is achieved by ($K \times i_L$)×R3, with the second capacitor C2 acts as a filter for ($K \times i_L$)×R3. The control circuit 410, e.g., a multi-phase controller, can receive the first representation of the current.

The AC component of the inductor current $i_L$ through the first winding L1 can be determined using the R1, C1 path. As seen in FIG. 4, the control circuit 410 can receive the current sensing information about the inductor current through the first winding L1, which can be obtained by sensing a voltage across the second capacitor C2, where the voltage across the second capacitor C2 represents a current through the first winding L1 of the first coupled inductor 402. The control circuit 410 can receive the voltage across the second capacitor C2 and can determine information about the coupled inductor current, such as peak current, valley current, and intermediate ripples.

For each additional phase of a multi-phase buck or boost converter, corresponding sensing networks can be included. For example, a similar configuration of R1, R2, R3, C1, C2 can be included and coupled to the second winding L2. The resistor R2 of a second sensing network receives the sum of the reproduced switch node voltages of the other phases (phases 1 and 3). For example, the control circuit 410 can reproduce the switch node voltage SW1 by multiplying the input voltage and the PWM signal (PWM1) that the control circuit 410 generates to control the switching elements Q1, Q2 of the first power stage assembly 404A. Similarly, the control circuit 410 can reproduce the switch node voltage SW3 by multiplying the input voltage and the PWM signal (PWM3) that the control circuit 410 generates to control the switching elements Q1, Q2 of the third power stage assembly 404C. The control circuit 410 can combine that information digitally and output a current representing that combined information to the resistor R2, A similar configuration of R1, R2, R3, C1, C2 can be included and coupled to the third winding L3. The control circuit 410 can similarly generate information for phases 1 and 2 and combine that information digitally and output a current representing that information to the resistor R2.

As noted in FIG. 4, additional corresponding control circuits and sensing networks can be included for each phase, similar to what is shown in FIG. 3.

Figure 5:
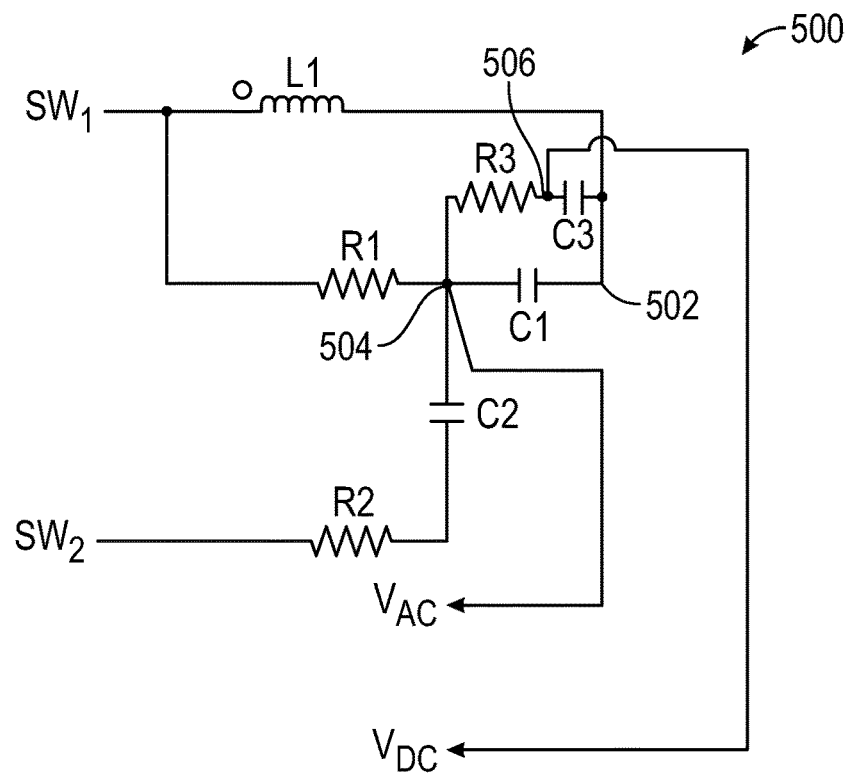
FIG. 5 is another example of a sensing network for use with a coupled inductor that can implement various techniques of this disclosure.

FIG. 5 is another example of a sensing network for use with a coupled inductor that can implement various techniques of this disclosure. In some examples, the sensing network 500 can be coupled to a buck or boost converter circuit, such as shown in FIG. 1. For example, the sensing network 500 can be coupled with switching nodes SW1 and SW2, which can each be a node between first and second switching elements, such as the first switching element Q1 and the second switching element Q2 in FIG. 1.

For simplicity, a single winding L1 of a coiled inductor is shown in FIG. 5. Like in FIG. 1, the sensing network 500 can include a first resistor R1 coupled to receive a signal representing voltage information at an input of the first winding L1, a second resistor R2 coupled to receive a signal representing voltage information at an input of the second winding, such as a second winding L2, a first capacitor C1 coupled between the first resistor R1 and a first sensing node 502, and a second capacitor C2 coupled between the second resistor R2 and a second sensing node 504.

The sensing network 500 can further include a third resistor R3 and a third capacitor C3 coupled in series, where the series connection of the third resistor R3 and the third capacitor C3 is coupled in parallel with the first capacitor C1 between the first sensing node 502 and the second sensing node 504. A control circuit, such as the control circuit 110 in FIG. 1, can receive the DC component of the inductor current $i_L$ through the first winding L1 by sensing at a node 506 between the third resistor R3 and the third capacitor C3. The control circuit can receive the AC component of the inductor current $i_L$ through the first winding L1 by sensing at the second sensing node 504.

Figure 6:
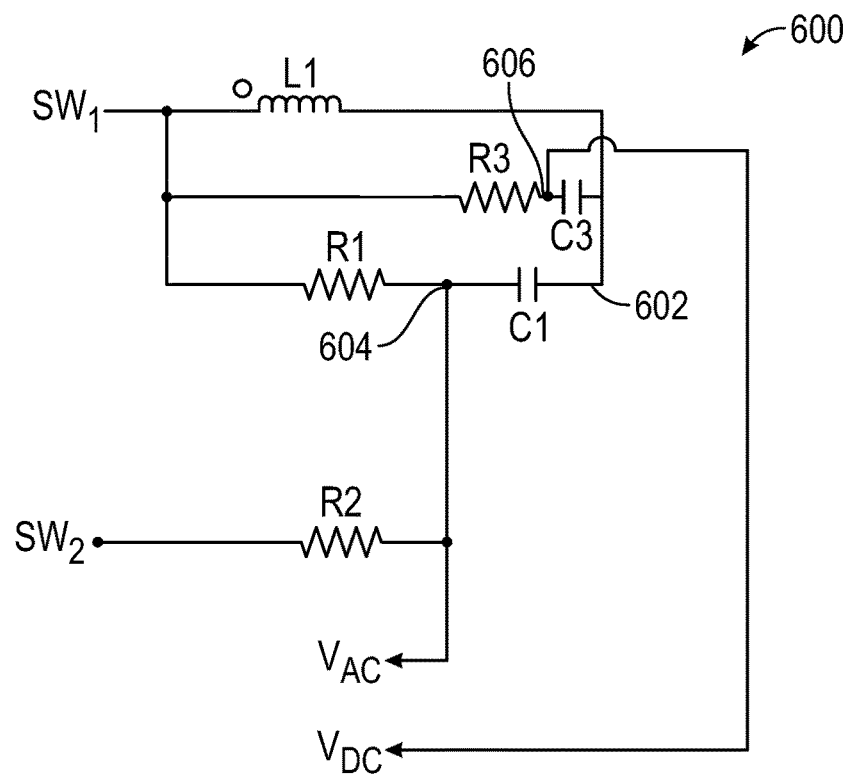
FIG. 6 is another example of a sensing network for use with a coupled inductor that can implement various techniques of this disclosure.

FIG. 6 is another example of a sensing network for use with a coupled inductor that can implement various techniques of this disclosure. The sensing network 600 can be a simplified version of the sensing network 500 of FIG. 5. The sensing network 600 of FIG. 6 eliminates the second capacitor C2 that was included in FIG. 5. In addition, the series connection of the third resistor R3 and the third capacitor C3 are coupled in parallel with the first resistor R1 and the first capacitor C1. In particular, the third resistor R3 is no longer connected between node 604 and node 606 and instead connected between switch node SW1 and node 606. The capacitor C1 is connected between sense nodes 602, 604.

A control circuit, such as the control circuit 110 in FIG. 1, can receive the DC component of the inductor current $i_L$ through the first winding L1 by sensing at a node 606 between the third resistor R3 and the third capacitor C3. The control circuit can receive the AC component of the inductor current $i_L$ through the first winding L1 by sensing at the sensing node 604.

The coupled inductor 302 of FIG. 3 is one example of a coupled inductor. Another example of a coupled inductor is a trans-inductor voltage regulator (TLVR) topology, such as shown and described below with respect to FIG. 7.

Figure 7:
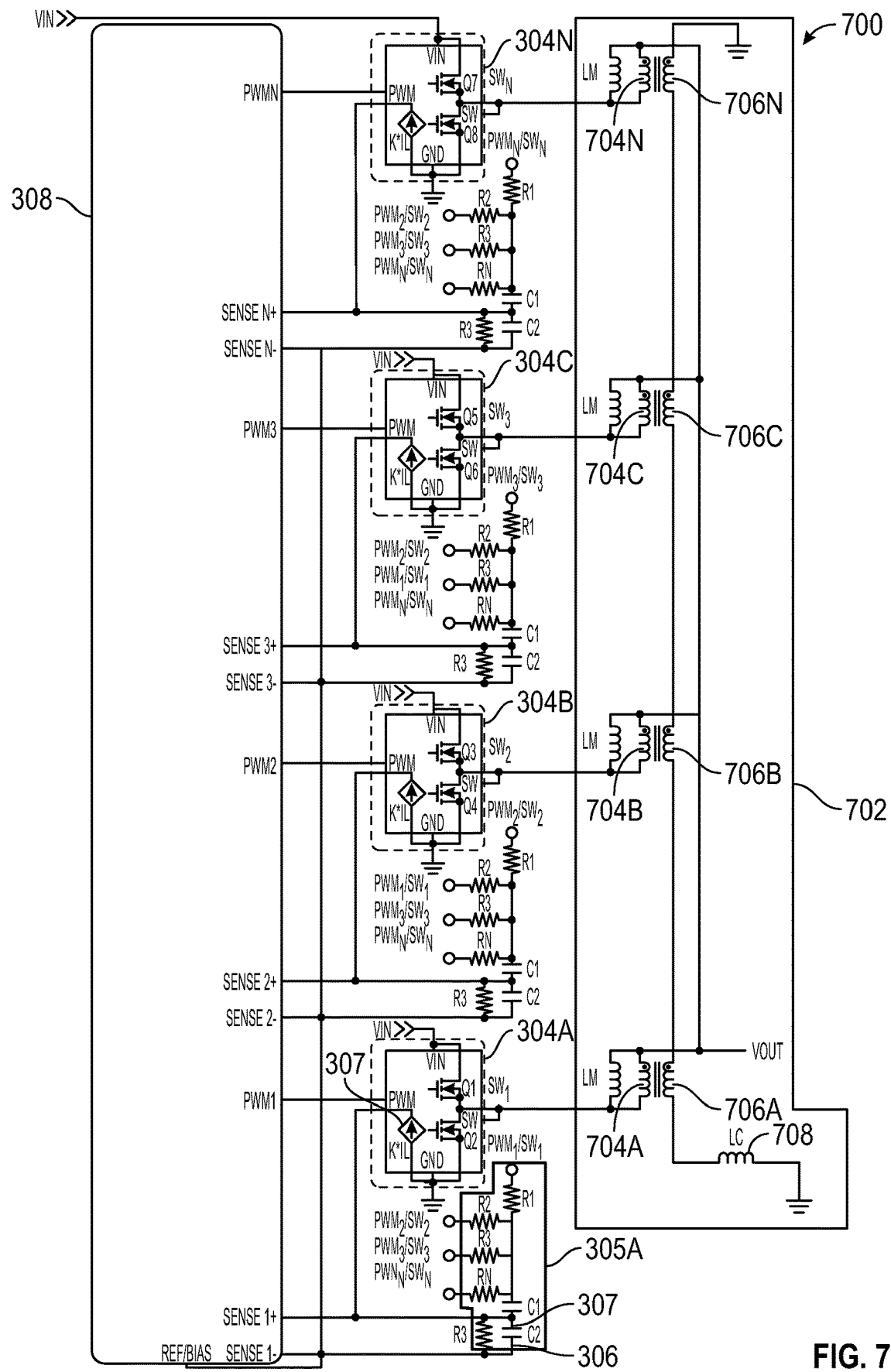
FIG. 7 is another example of a current sensing circuit for use with a coupled inductor that can implement various techniques of this disclosure.

FIG. 7 is another example of a current sensing circuit for use with a coupled inductor that can implement various techniques of this disclosure. The current sensing circuit 700 of FIG. 7 can be used along with a power stage assembly, such as a driver FET (DrMOS) module. The current sensing circuit 700 of FIG. 7 is similar to the circuit 300 of FIG. 3, but shows a multi-phase TLVR 702, which is an example of a coupled inductor. The TLVR 702 is an N-phase single-secondary TLVR. In other examples, the TLVR 702 can be a dual-secondary topology or an M-secondary multi-phase trans-inductor voltage regulator topology.

The TLVR 702 can include a primary side having N primary windings 704A-704N and a secondary side including corresponding linked secondary windings 706A-706N. An inductor $L_C$ 708 can be included on the secondary side. In the example shown in FIG. 7, the inductor Lc 708 can be a discrete inductor.

Using the current sensing technique of FIG. 7, the current sensing circuit can use each PWMN or switch node signal (SWN) to determine the current through each winding of a coupled inductor. The example of a current sensing circuit 700 can include a coupled inductor 702 including a first winding 704A and a first sensing network coupled with the coupled inductor 702.

The circuit 700 can include a first power stage assembly 304A, such as a DrMOS module. The first power stage assembly 304A can include a first switching circuit including a first switching element Q1 and a second switching element Q2. The first winding 704A of the coupled inductor 702 can be coupled to a first switching node SW1 between the first switching element Q1 and the second switching element Q2.

The first sensing network 305A can include a first resistor R1 coupled to receive a signal representing voltage information at an input of the first winding 704A, a second resistor R2 coupled to receive a signal representing voltage information at an input of a second winding 704B of the coupled inductor 702, a first capacitor C1 coupled between the first resistor R1 and a first sensing node 306, and a second capacitor C2 coupled between the second resistor R2 and a second sensing node 307.

In contrast to FIG. 2 in which the first resistor R1 is coupled with an input of the first winding 704A, the first resistor R1 in the example shown in FIG. 7 is coupled to receive an output of the control circuit 308, e.g., a multi-phase controller. The control circuit 308 can reproduce the switch node voltage SW1 by multiplying the input voltage and the PWM signal (PWM1) that the control circuit 308 generates to control the switching elements Q1 and Q2 of the first power stage assembly 304A. The first resistor R1 can be connected to receive the reproduced switch node voltage SW1.

For each additional phase of a multi-phase buck or boost converter, a corresponding additional power stage assembly is needed, shown as 304B-304N, coupled to the control circuit 308. The control circuit 308 can send a PWM signal that corresponds to each power stage assembly. Like with the first resistor R1, the second resistor R2 can be coupled with a second output of the control circuit 308. For example, a second power stage assembly 304B like the first power stage assembly 304A can be included. The second power stage assembly 304B can include two switching elements with a second switch node voltage SW2 therebetween. The control circuit 308 can reproduce the second switch node voltage SW2 by multiplying the input voltage and a second PWM signal (PWM2) that the control circuit 308 generates to control the switching elements of the second power stage assembly. The second resistor R2 can be connected to receive the reproduced switch node voltage SW2. The control circuit 308 can receive the current information through each corresponding additional winding, such as windings 704B and 704C, of the coupled inductor 702. The techniques of FIG. 7 are not limited to coupled inductors with one, two, or three windings. Rather, the techniques can be extended to N windings. For each additional phase of a multi-phase buck or boost converter, corresponding additional second resistors R2A-R2N can be included and connected to receive a reproduced switch node voltage corresponding to the phase. For example, the coupled inductor 702 can include a third winding 704C, and the first sensing network 305A can include resistor coupled in parallel with the second resistor R2, where the resistor R2A is coupled to a third output of the control circuit and coupled to receive a signal representing voltage information at an input of the third winding 704C. That is, the control circuit 308 can reproduce a third switch node voltage SW3 of a third power stage assembly 304C by multiplying the input voltage and a third PWM signal (PWM3) that the control circuit 308 generates to control the switching elements of the third power stage assembly 304C. The resistor R2A can be connected to receive the reproduced switch node voltage SW3.

The first power stage assembly 304A can also include a first signal source 307. The first signal source 307 can output a first representation of a current through the first winding 704A of the coupled inductor 702, where the representation includes a DC component of the current through the first winding of the first coupled inductor. For example, the first signal source 307 can output a first representation of the current through the first winding 704A, where the first representation is a scaling factor K multiplied by the inductor current $i_L$ through the first winding L1 ($K \times i_L$). The DC component of the current is achieved by $(K \times i_L) \times R3$, with the second capacitor C2 acts as a filter for $(K \times i_L) \times R3$. The control circuit 308, e.g., a multi-phase controller, can receive the first representation of the current.

The AC component of the inductor current $i_L$ through the first winding 704A can be determined using the R1, C1 path. As seen in FIG. 7, the control circuit 308 can receive the current sensing information about the inductor current through the first winding 704A, which can be obtained by sensing a voltage across the second capacitor C2, where the voltage across the second capacitor C2 represents a current through the first winding 704A of the coupled inductor 702. The control circuit 308 can receive the voltage across the second capacitor C2 and can determine information about the coupled inductor current, such as peak current, valley current, and intermediate ripples.

As seen in FIG. 7, additional sensing networks, similar to the first sensing network 305A, can be included for each of the N phases.

Figure 8:
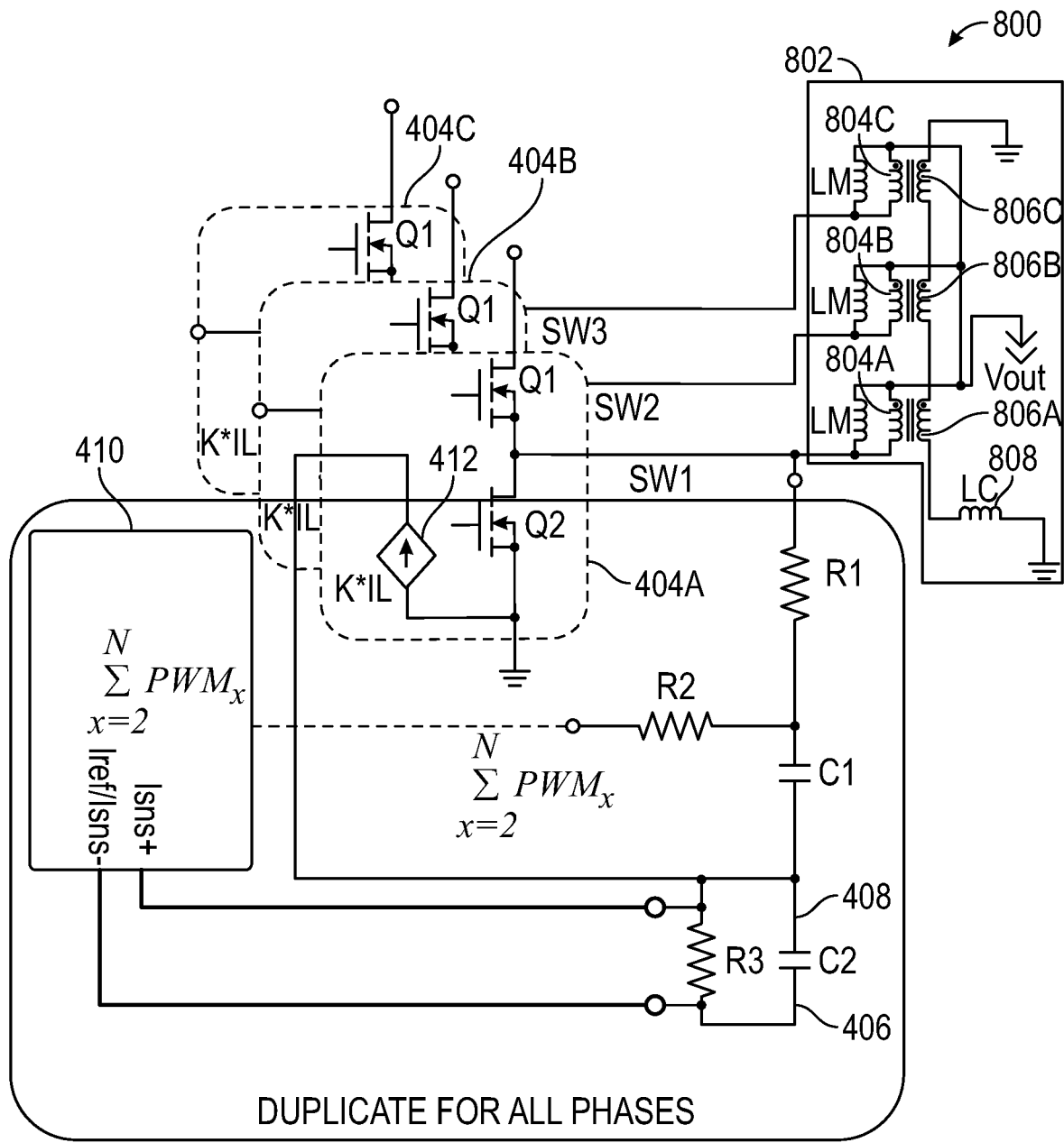
FIG. 8 is another example of a current sensing circuit for use with a coupled inductor that can implement various techniques of this disclosure.

FIG. 8 is another example of a current sensing circuit for use with a coupled inductor that can implement various techniques of this disclosure. The current sensing circuit 800 of FIG. 8 can be used along with a power stage assembly, such as a driver FET (DrMOS) module. Using the current sensing technique of FIG. 8, the current sensing circuit can sum the PWM or switch node signals (VSW) to determine the current through each winding of a coupled inductor. The example of a current sensing circuit 800 can include a coupled inductor 802. The coupled inductor 802 can be a TLVR, such as a multi-phase TLVR. The TLVR 802 is an N-phase single-secondary TLVR. In other examples, the TLVR 802 can be a dual-secondary or an M-secondary multi-phase trans-inductor voltage regulator topologies.

The TLVR 802 can include a primary side having three primary windings 804A-804C and a secondary side including corresponding linked secondary windings 806A-806C. An inductor $L_C$ 808 can be included on the secondary side. In the example shown in FIG. 8, the inductor $L_C$ 808 can be a discrete inductor.

For a 3-phase implementation, the circuit 800 can include power stage assemblies 404A-404C, such as DrMOS modules. Each power stage assembly can include a first switching circuit including a first switching element Q1 and a second switching element Q2. Referring to the first power stage assembly 404A, the first winding 804A of the coupled inductor 802 can be coupled to a first switching node SW1 between the first switching element Q1 and the second switching element Q2. The windings 804B, 804C of the coupled inductor 802 can be similarly coupled with power stage assemblies 404B, 404C, respectively.

The circuit 400 can include sensing networks similar to those described above. For example, a first sensing network can include a first resistor R1 coupled to receive a signal representing voltage information at an input of the first winding 804A, a second resistor R2 coupled to receive a signal representing voltage information at an input of a second winding 804B of the coupled inductor 802, a first capacitor C1 coupled between the first resistor R1 and a first sensing node 406, and a second capacitor C2 coupled between the second resistor R2 and a second sensing node 408. In the example shown in FIG. 8, the first resistor R1 is coupled with an input of the first winding 804A. The sensing network shown can be duplicated for each of the phases.

The first power stage assembly 404A, such as a DrMOS module, can include a first switching circuit including a first switching element Q1 and a second switching element Q2. The first winding 804A of the coupled inductor 202 can be coupled to a first switching node SW1 between the first switching element Q1 and the second switching element Q2. The power stage assemblies 404B, 404C can be similarly configured.

In contrast to FIG. 2 in which the resistors R2 and R2A-R2N were each connected to a corresponding output of the control circuit, in FIG. 8, the resistor R2 of a sensing network receives the sum of the reproduced switch node voltages of the other phases (phases 2 and 3). For example, the control circuit 410 can reproduce the switch node voltage SW2 at an input of the second winding 804B by multiplying the input voltage and the PWM signal (PWM2) that the control circuit 410 generates to control the switching elements Q1, Q2 of the second power stage assembly 404B. Similarly, the control circuit 410 can reproduce the switch node voltage SW3 at an input of the third winding 804C by multiplying the input voltage and the PWM signal (PWM3) that the control circuit 410 generates to control the switching elements Q1, Q2 of the third power stage assembly 404C. The control circuit 410 can combine that information digitally and output a current representing that combined information to the resistor R2. In this manner, the control circuit is configured to generate a signal representing a combination of information about the second winding 804B and the third winding 804C.

The first power stage assembly 404A can also include a first signal source 412. The first signal source 412 can output a first representation of a current through the first winding 804A of the first coupled inductor 402, where the representation includes a DC component of the current through the first winding 804A of the first coupled inductor. For example, the first signal source 412 can output a first representation of the current through the first winding 804A, where the first representation is a scaling factor K multiplied by the inductor current $i_L$ through the first winding 804A ($K \times i_L$). The DC component of the current is achieved by ($K \times i_L$)×R3, with the second capacitor C2 acts as a filter for ($K \times i_L$)×R3. The control circuit 410, e.g., a multi-phase controller, can receive the first representation of the current.

The AC component of the inductor current $i_L$ through the first winding 804A can be determined using the R1, C1 path. As seen in FIG. 4, the control circuit 410 can receive the current sensing information about the inductor current through the first winding 804A, which can be obtained by sensing a voltage across the second capacitor C2, where the voltage across the second capacitor C2 represents a current through the first winding 804A of the coupled inductor 802. The control circuit 410 can receive the voltage across the second capacitor C2 and can determine information about the coupled inductor current, such as peak current, valley current, and intermediate ripples.

For each additional phase of a multi-phase buck or boost converter, corresponding sensing networks can be included. For example, a similar configuration of R1, R2, R3, C1, C2 can be included and coupled to the second winding 804B. The resistor R2 of a second sensing network receives the sum of the reproduced switch node voltages of the other phases (phases 1 and 3). For example, the control circuit 410 can reproduce the switch node voltage SW1 by multiplying the input voltage and the PWM signal (PWM1) that the control circuit 410 generates to control the switching elements Q1, Q2 of the first power stage assembly 404A. Similarly, the control circuit 410 can reproduce the switch node voltage SW3 by multiplying the input voltage and the PWM signal (PWM3) that the control circuit 410 generates to control the switching elements Q1, Q2 of the third power stage assembly 404C. The control circuit 410 can combine that information digitally and output a current representing that combined information to the resistor R2.

A similar configuration of R1, R2, R3, C1, C2 can be included and coupled to the third winding 804C. The control circuit 410 can similarly generate information for phases 1 and 2 and combine that information digitally and output a current representing that information to the resistor R2.

As noted in FIG. 8, additional corresponding control circuits and sensing networks can be included for each phase, similar to what is shown in FIG. 3.

Figure 9:
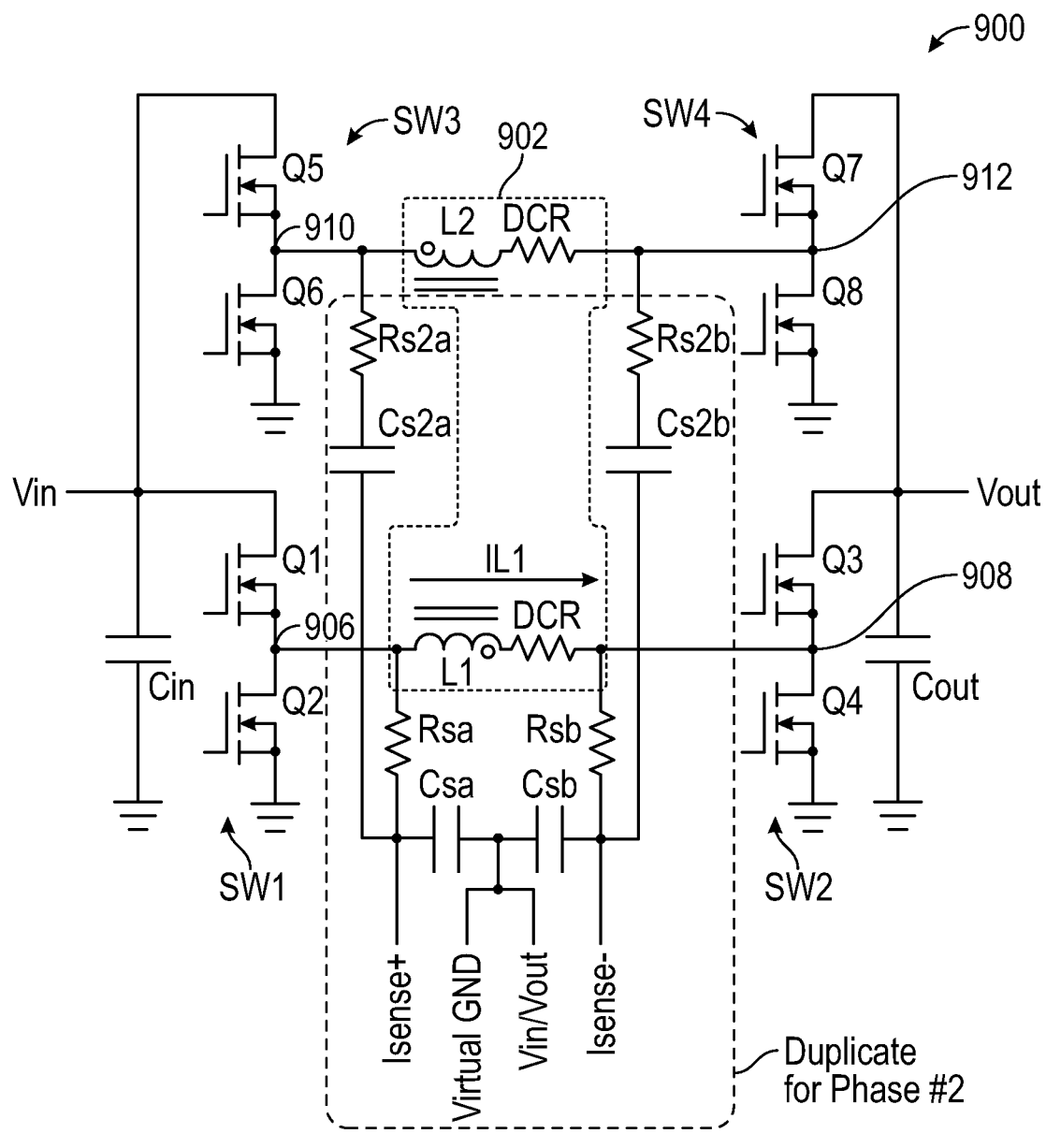
FIG. 9 is an example of a 4-switch buck-boost converter circuit having a current sensing circuit that can implement various techniques of this disclosure.
Figure 9:
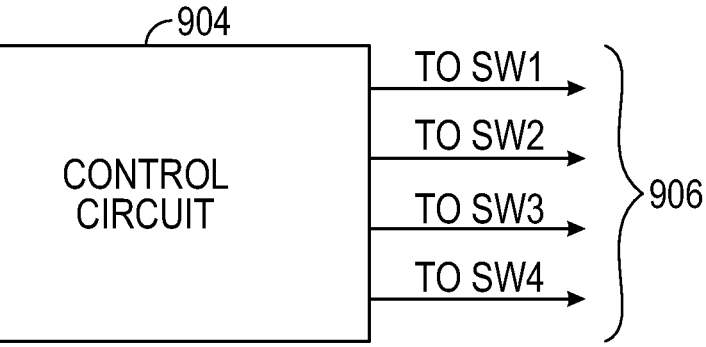

FIG. 9 is an example of a 4-switch buck-boost converter circuit having a current sensing circuit that can implement various techniques of this disclosure. The 4-switch buck-boost converter circuit 900 can include a switching circuits SW1-SW4 arranged in a buck-boost regulator configuration. The 4 switches, or switching circuits SW1-SW4, can be arranged in an H-bridge structure, such as shown in FIG. 9. The first switching circuit SW1 includes switching elements, e.g., transistors, Q1, Q2, the second switching circuit SW2 includes switching elements Q3, Q4, the third switching circuit SW3 includes switching elements Q5, Q6, and the fourth switching circuit SW4 includes switching elements Q7, Q8.

If the switching element Q3 is ON and the switching element Q4 is OFF, the control circuit 904 can adjust a duty cycle of the switching elements Q1 and Q2 to implement a buck converter. If the switching element Q1 is ON and the switching element Q2 is OFF, the control circuit 904 can adjust a duty cycle of the switching elements Q3 and Q4 to implement a boost converter.

The input voltage Vin can be higher or lower than the output Vout. Even if the input voltage Vin is not well regulated, the output voltage Vout can be well regulated.

The buck-boost converter circuit 900 can include a coupled inductor 902 including a first winding L1 and a second winding L2. An input of the first winding L1 can be coupled to a switching node 906 between the switching element Q1 and the switching element Q2. An output of the first winding L1 can be coupled to a second switching node 908 between the third switching element Q3 and the fourth switching element Q4. An input of the second winding L2 can be coupled to a third switching node 910 between the fifth switching element Q5 and the sixth switching element Q6. The output of the second winding L2 can be coupled to a fourth switching node 912 between the seventh switching element Q7 and the eighth switching element Q8.

The buck-boost converter circuit 900 can include a first sensing network coupled with the coupled inductor 902. The first sensing network can include a first resistor Rsa coupled to receive a signal representing voltage information at an input of the first winding L, a second resistor Rs2a coupled to receive a signal representing voltage information at an input of the second winding L2, a first capacitor Csa coupled between the first resistor Rsa and a first sensing node Isense−, and a second capacitor Cs2a coupled between the second resistor Rs2a and a second sensing node Isense+.

The buck-boost converter circuit 900 can include a control circuit 904 coupled with the first sensing node Isense− and the second sensing node Isense+.

The control circuit 904 can receive a first voltage across the first capacitor Csa and a second capacitor Csb, where the first voltage represents a current IL1 through the first winding L1 of the coupled inductor 902, such as the DCR current sensing on the first winding L1. As seen in FIG. 9, a midpoint of the capacitor Csa and the capacitor Csb can be coupled to a steady voltage or virtual ground. Using the current information, the control circuit 904 can generate outputs signals 906 to control the gates of the transistors of the switches SW1-SW4.

In some examples, the buck-boost converter circuit 900 can include a second sensing network coupled with the coupled inductor 902. The second sensing network can include a third resistor Rsb coupled to receive a signal representing voltage information at the output of the first winding L1, a fourth resistor Rs2b coupled to receive a signal representing voltage information at an output of the second winding L2, a third capacitor Csb coupled between the third resistor Rsb and the second sensing node Isense+, and a fourth capacitor Cs2b coupled between the fourth resistor Rs2b and the first sensing node Isense−.

In this manner, these techniques can inject Rs2a/Cs2a current from a first switch node to Rsa/Csa and inject Rs2b/Cs2b current from a second switch node to Rsb/Csb to provide accurate current sensing.

Figure 10:
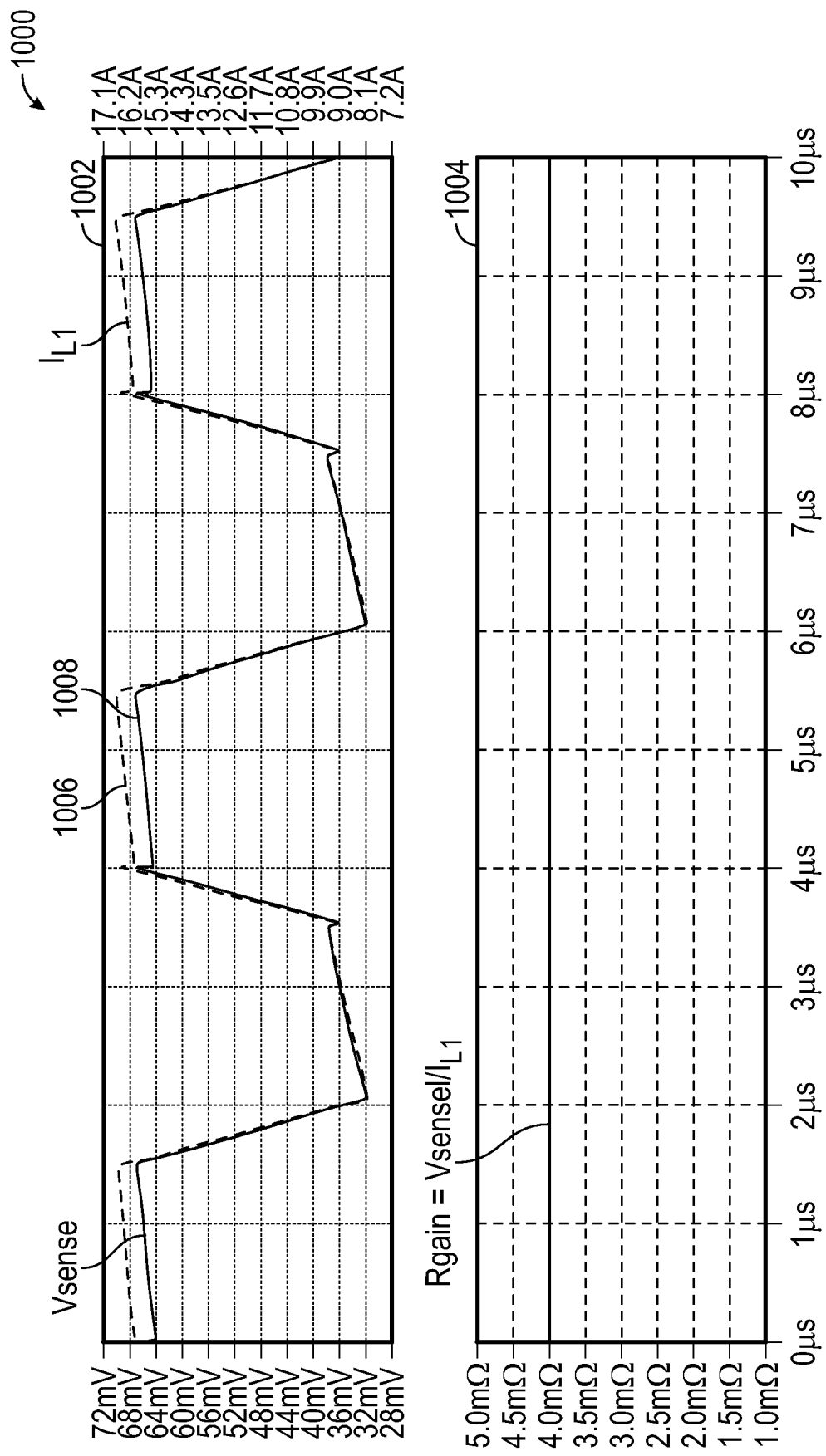
FIG. 10 is a graph depicting simulated results of the current sensing techniques of FIG. 9.

FIG. 10 is a graph depicting simulated results of the current sensing techniques of FIG. 9. The graph 1000 includes a top portion 1002 and a bottom portion 1004. The top portion 1002 depicts a waveform 1006 that represents the inductor current IL1 through the winding L1 of the coupled inductor 902 in FIG. 9. The top portion 1002 further depicts a waveform 1008 that represents Vsense, which is the voltage across sensing nodes Isense+ and Isense− in FIG. 9.

As seen, the waveform 1008 closely tracks the waveform 1006. The ratio of Vsense to IL1 represents the resistance gain $R_{GAIN}$, which is depicted in the bottom portion 1008.

Figure 11:
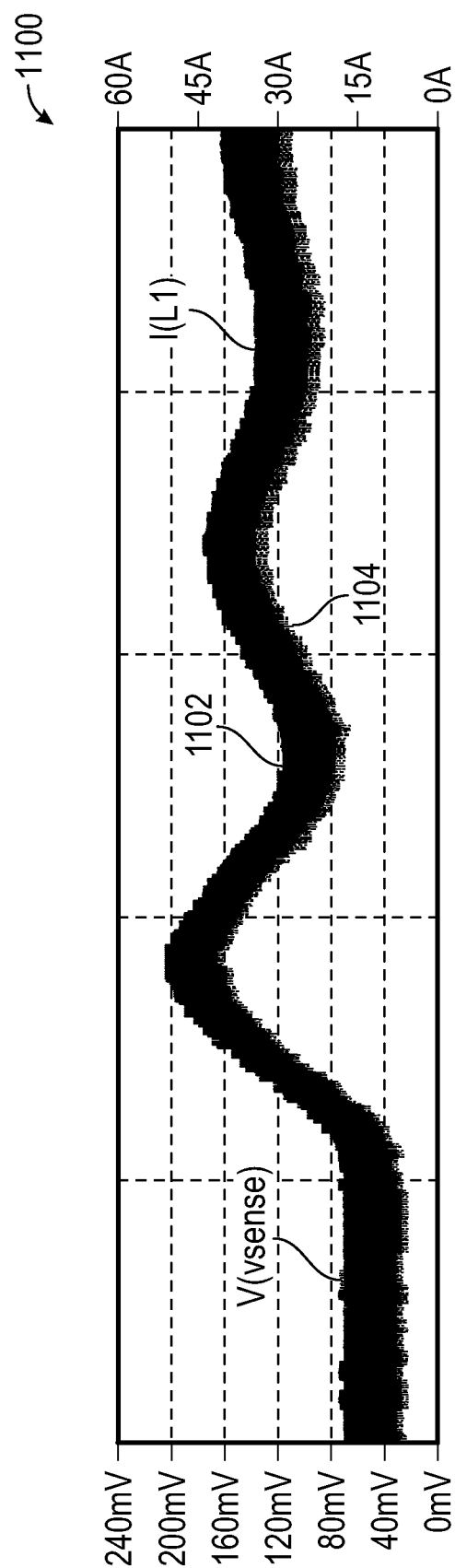
FIG. 11 is another graph depicting simulated results of the current sensing techniques of FIG. 9.

FIG. 11 is another graph depicting simulated results of the current sensing techniques of FIG. 9. The graph 1100 depicts a waveform 1102 of a transient response of the inductor current IL1. The waveform 1104 represents Vsense, which is the voltage across sensing nodes Isense+ and Isense− in FIG. 9. As seen in FIG. 11, Vsense can track the transient response of the inductor current IL1.

Figure 12:
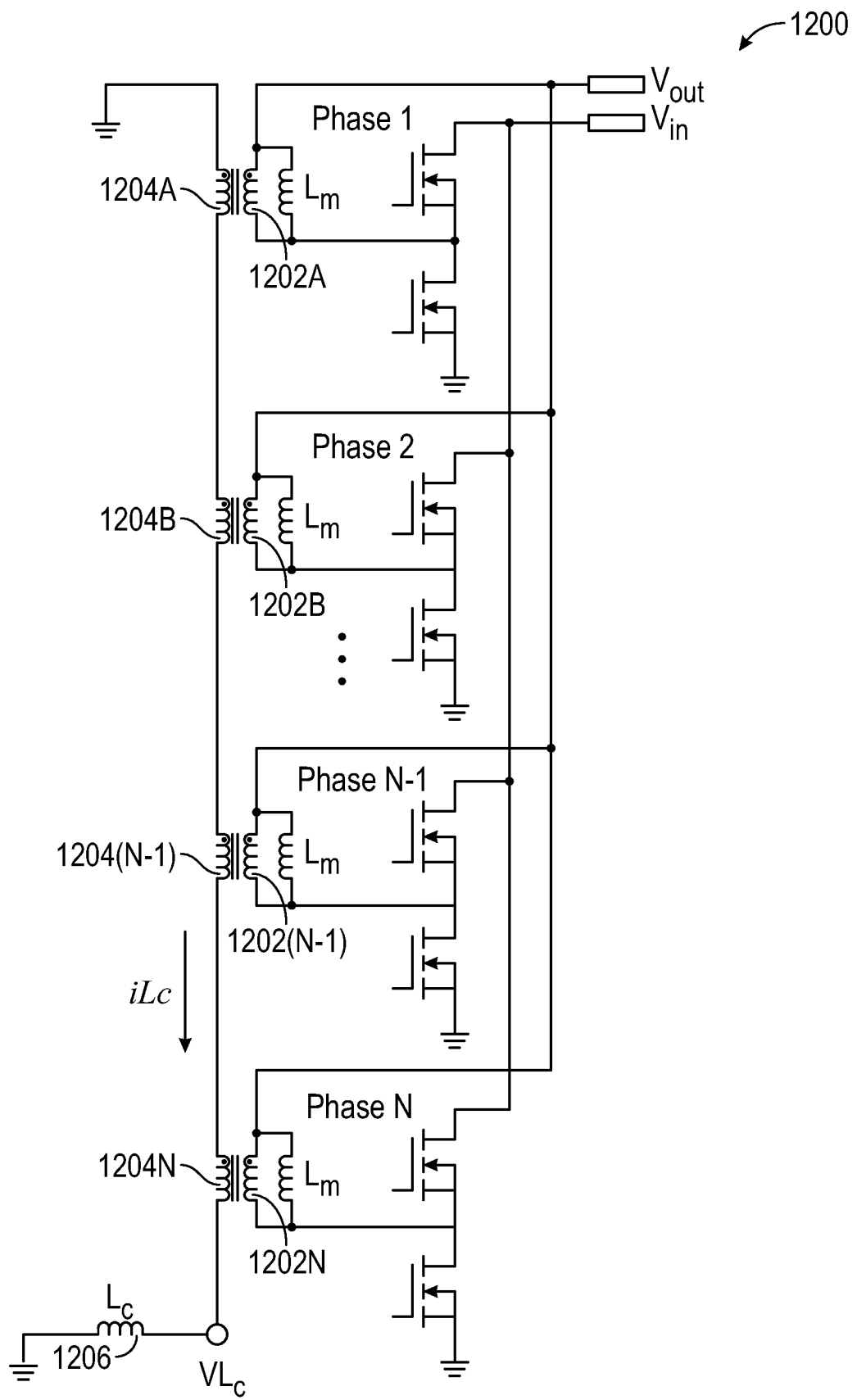
FIG. 12 is an example of a multi-phase trans-inductor voltage regulator.

FIG. 12 is an example of a multi-phase trans-inductor voltage regulator. The TLVR 1200 of FIG. 12 is an N-phase single-secondary TLVR, which is an example of a coupled inductor that can be used with sensing techniques of this disclosure. The TLVR 1200 can include a primary side having N primary windings 1202A-1202N and a secondary side including corresponding linked secondary windings 1204A-1204N. An inductor $L_C$ 1206 can be included on the secondary side. In the example shown in FIG, 12, the inductor Lc 1206 can be a discrete inductor.

Various Notes

Each of the non-limiting aspects or examples described herein may stand on its own, or may be combined in various permutations or combinations with one or more of the other examples.

The above detailed description includes references to the accompanying drawings, which form a part of the detailed description. The drawings show, by way of illustration, specific embodiments in which the invention may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following aspects, the terms "including" and "comprising" are open-ended, that is, a system, device, article, composition, formulation, or process that includes elements in addition to those listed after such a term in a aspect are still deemed to fall within the scope of that aspect. Moreover, in the following aspects, the terms "first," "second," and "third," etc. are used merely as labels, and are not intended to impose numerical requirements on their objects.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact discs and digital video discs), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the aspects. Also, in the above Detailed Description, various features may be grouped together to streamline the disclosure. This should not be interpreted as intending that an unclaimed disclosed feature is essential to any aspect. Rather, inventive subject matter may lie in less than all features of a particular disclosed embodiment. Thus, the following aspects are hereby incorporated into the Detailed Description as examples or embodiments, with each aspect standing on its own as a separate embodiment, and it is contemplated that such embodiments may be combined with each other in various combinations or permutations. The scope of the invention should be determined with reference to the appended aspects, along with the full scope of equivalents to which such aspects are entitled.

The claimed invention is:

1. A circuit comprising:
   a first coupled inductor including a first winding and a second winding, wherein the first coupled inductor forms part of a multi-phase trans-inductor voltage regulator;
   a first sensing network coupled with the first coupled inductor, the first sensing network including:
   a first resistor coupled with an input of the first winding, wherein the first resistor is coupled to receive a signal representing voltage information at an input of the first winding;
   a second resistor coupled with an input of the second winding, wherein the second resistor is coupled to receive a signal representing voltage information at an input of the second winding;
   a first capacitor coupled between the first resistor and a first sensing node; and
   a second capacitor coupled between the second resistor and a second sensing node;
   a second sensing network coupled with the first coupled inductor, the second sensing network including:
   a third resistor coupled with the input of the second winding, wherein the third resistor is coupled to receive the signal representing voltage information at the input of the second winding;
   a fourth resistor coupled with the input of the first winding, wherein the fourth resistor is coupled to receive the signal representing voltage information at the input of the first winding;
   a third capacitor coupled between the third resistor and a third sensing node; and
   a fourth capacitor coupled between the fourth resistor and a fourth sensing node; and
   a control circuit coupled with the first sensing node and the second sensing node, the control circuit to:
   receive a first voltage across at least the first capacitor, wherein the first voltage represents a current through the first winding of the first coupled inductor; and
   receive a second voltage across at least the third capacitor, wherein the second voltage represents a current through the second winding of the first coupled inductor.

2. The circuit of claim 1, comprising:
   a first switching circuit including a first switching element and a second switching element, the first winding coupled to a first switching node between the first switching element and the second switching element; and
   a second switching circuit including a third switching element and a fourth switching element, the second winding coupled to a second switching node between the third switching element and the fourth switching element,
   wherein the control circuit is coupled with the first switching circuit and the second switching circuit, the control circuit to:
   control operation of the first switching circuit and the second switching circuit using a timing phase.

3. The circuit of claim 2, wherein the first switching circuit and the second switching circuit are arranged in a buck regulator configuration.

4. The circuit of claim 2, wherein the first switching circuit and the second switching circuit are arranged in a boost regulator configuration.

5. The circuit of claim 1, comprising:
   a first power stage assembly including:
   a first switching circuit including a first switching element and a second switching element, the first winding coupled to a first switching node between the first switching element and the second switching element; and
   a first signal source to output a first representation of a current through the first winding of the first coupled inductor, wherein the first representation includes a DC component of the current through the first winding of the first coupled inductor; and a second power stage assembly including:
a second switching circuit including a third switching element and a fourth switching element, the second winding coupled to a second switching node between the third switching element and the fourth switching element; and
a second signal source to output a second representation of a current through the second winding of the first coupled inductor, wherein the second representation includes a DC component of the current through the second winding of the first coupled inductor, and
the control circuit to receive the first and second representations of the current.

6. The circuit of claim 1, wherein the first resistor is coupled with a first output of the control circuit, and wherein the second resistor is coupled with a second output of the control circuit.

7. The circuit of claim 6, wherein the first coupled inductor includes a third winding, wherein the first sensing network includes a third resistor coupled in parallel with the second resistor, wherein the third resistor is coupled to a third output of the control circuit and coupled to receive a signal representing voltage information at an input of the third winding.

8. The circuit of claim 1, wherein the first resistor is coupled with an input of the first winding, and wherein the second resistor is coupled with an output of the control circuit.

9. The circuit of claim 8, wherein the first coupled inductor includes a third winding, wherein the control circuit is configured to generate a signal representing a combination of information about the second winding and the third winding, and wherein the second resistor coupled with the output of the control circuit is configured to receive the signal.

10. The circuit of claim 1, wherein the first sensing network further includes:
a third resistor and a third capacitor connected in series, wherein the series connection of the third resistor and the third capacitor is coupled in parallel with the first capacitor between the first sensing node and the second sensing node.

11. A method of sensing inductor winding current in a coupled inductor including a first winding and a second winding, wherein the coupled inductor forms part of a multi-phase trans-inductor voltage regulator, the method including:
coupling a first resistor with an input of the first winding to receive a signal representing voltage information at an input of the first winding;
coupling a second resistor with an input of the second winding to receive a signal representing voltage information at an input of the second winding;
coupling a first capacitor between the first resistor and a first sensing node;
coupling a second capacitor between the second resistor and a second sensing node, wherein a sensing network includes the first resistor, the second resistor, the first capacitor, and the second capacitor;
coupling a third resistor with the input of the second winding to receive the signal representing voltage information at the input of the second winding;
coupling a fourth resistor with the input of the first winding to receive the signal representing voltage information at the input of the first winding;

receiving a first voltage across the first capacitor, wherein the first voltage represents a current through the first winding of the coupled inductor; and
receiving a second voltage across the third capacitor, wherein the second voltage represents a current through the second winding of the coupled inductor.

12. The method of claim 11, comprising:
coupling the sensing network to a switching circuit including a first switching element and a second switching element, the first winding coupled to a first switching node between the first switching element and the second switching element; and
controlling operation of the switching circuit using a timing phase.

13. A circuit comprising:
a first coupled inductor including a first winding and a second winding, wherein the first coupled inductor forms part of a multi-phase trans-inductor voltage regulator;
a first sensing network coupled with the first coupled inductor, the first sensing network including:
a first resistor coupled with an input of the first winding;
a second resistor coupled with an input of the second winding;
a first capacitor coupled between the first resistor and a first sensing node; and
a second capacitor coupled between the second resistor and a second sensing node;
a second sensing network coupled with the first coupled inductor, the second sensing network including:
a third resistor coupled with the input of the second winding;
a fourth resistor coupled with the input of the first winding;
a third capacitor coupled between the third resistor and a third sensing node; and
a fourth capacitor coupled between the fourth resistor and a fourth sensing node; and
a control circuit coupled with the first sensing node and the second sensing node, the control circuit to:
receive a first voltage across the first capacitor, wherein the first voltage represents a current through the first winding of the first coupled inductor; and
receive a second voltage across at least the third capacitor, wherein the second voltage represents a current through the second winding of the first coupled inductor.

14. The circuit of claim 13, comprising:
a first switching circuit including a first switching element and a second switching element, the first winding coupled to a first switching node between the first switching element and the second switching element; and
a second switching circuit including a third switching element and a fourth switching element, the second winding coupled to a second switching node between the third switching element and the fourth switching element,
wherein the control circuit is coupled with the first switching circuit and the second switching circuit, the control circuit to:
control operation of the first switching circuit and the second switching circuit using a timing phase.

15. The circuit of claim 14, wherein the first switching circuit and the second switching circuit are arranged in a buck regulator configuration.

16. A circuit comprising:

a first coupled inductor including a first winding and a second winding;

a first sensing network coupled with the first coupled inductor, the first sensing network including:
- a first resistor coupled to receive a signal representing voltage information at an input of the first winding;
- a second resistor coupled to receive a signal representing voltage information at an input of the second winding;
- a first capacitor coupled between the first resistor and a first sensing node; and
- a second capacitor coupled between the second resistor and a second sensing node, and a second sensing network coupled with the first coupled inductor, the second sensing network including:
- a third resistor coupled to receive a signal representing voltage information at an output of the first winding;
- a fourth resistor coupled to receive a signal representing voltage information at an output of the second winding;
- a third capacitor coupled between the third resistor and the second sensing node; and
- a fourth capacitor coupled between the fourth resistor and the first sensing node, and a control circuit coupled with the first sensing node and the second sensing node, the control circuit to:
receive a first voltage across the first capacitor and the second capacitor, wherein the first voltage represents a current through the first winding of the first coupled inductor.

17. The circuit of claim 16, comprising:

a first switching circuit including a first switching element and a second switching element, the input of the first winding coupled to a first switching node between the first switching element and the second switching element;

a second switching circuit including a third switching element and a fourth switching element, the output of the first winding coupled to a second switching node between the third switching element and the fourth switching element;

a third switching circuit including a fifth switching element and a sixth switching element, the input of the second winding coupled to a third switching node between the fifth switching element and the sixth switching element; and a fourth switching circuit including a seventh switching element and an eighth switching element, the output of the second winding coupled to a fourth switching node between the seventh switching element and the eighth switching element, wherein the first switching circuit, the second switching circuit, the third switching circuit, and the fourth switching circuit are arranged in a buck-boost regulator configuration.

\* \* \* \* \*